(12) United States Patent
Ruby (10) Patent No.: US 7,454,844 B1
(45) Date of Patent: Nov. 25, 2008

(54) SHEETROCK PUNCH APPARATUS

(76) Inventor: Laszlo Ruby, 7640 NW. 8th St., Pembroke Pines, FL (US) 33024

( * ) Notice: Subject to any disclaimer, the term of this patent is extended or adjusted under 35 U.S.C. 154(b) by 0 days.

(21) Appl. No.: 11/224,521

(22) Filed: Sep. 12, 2005

(51) Int. Cl.
*B26F 1/32* (2006.01)
*G01B 5/14* (2006.01)

(52) U.S. Cl. ................. 33/528; 33/DIG. 10; 30/358

(58) Field of Classification Search ............ 33/528, 33/48, DIG. 109; 30/305, 315, 316, 358, 30/359, 360, 361, 362
See application file for complete search history.

(56) References Cited

U.S. PATENT DOCUMENTS

| | | | | |
|---|---|---|---|---|
| 864,396 | A * | 8/1907 | Weston | 33/489 |
| 2,919,913 | A * | 1/1960 | Phair | 269/50 |
| 2,990,172 | A * | 6/1961 | Gianotta | 269/50 |
| 3,436,070 | A * | 4/1969 | Sanson et al. | 269/8 |
| 3,522,658 | A * | 8/1970 | Howell | 33/528 |
| 3,738,010 | A * | 6/1973 | Carder | 33/489 |
| 3,888,068 | A * | 6/1975 | Zambrano | 30/358 |
| 4,055,892 | A * | 11/1977 | Del Vecchio | 30/303 |
| 4,228,592 | A * | 10/1980 | Badger | 33/562 |
| 4,527,337 | A * | 7/1985 | Dreiling | 33/562 |
| 4,730,395 | A * | 3/1988 | Blessing, Sr. | 30/360 |
| 4,969,269 | A * | 11/1990 | Dominguez | 30/360 |
| 5,222,303 | A * | 6/1993 | Jardine | 33/528 |
| 5,301,446 | A * | 4/1994 | Kurtz | 40/591 |
| 5,357,683 | A * | 10/1994 | Trevino | 33/528 |
| 5,615,490 | A * | 4/1997 | Burchell | 33/528 |
| 5,797,189 | A * | 8/1998 | Gilbert | 30/500 |
| 5,860,219 | A * | 1/1999 | Wilkinson | 33/528 |
| D406,537 | S * | 3/1999 | Sharp | D10/65 |
| 5,946,809 | A * | 9/1999 | Bright | 30/361 |
| 6,484,408 | B1 * | 11/2002 | Dove | 30/360 |
| 6,546,641 | B1 * | 4/2003 | Boule | 33/528 |
| 2002/0184778 | A1 * | 12/2002 | Yrazabal | 33/528 |
| 2004/0035015 | A1 * | 2/2004 | O'Connor | 33/528 |
| 2006/0207108 | A1 * | 9/2006 | Lucero | 30/315 |
| 2006/0265893 | A1 * | 11/2006 | Gifford | 33/528 |

* cited by examiner

*Primary Examiner*—R. A. Smith
(74) *Attorney, Agent, or Firm*—Gold & Rizvi, P.A.; Glenn E. Gold; H. John Rizvi (57) ABSTRACT

A punch apparatus for cutting an opening in a sheet of material is disclosed. The punch apparatus includes a base plate, a measuring stick provided on the base plate and a punch assembly having multiple blades adjustably mounted on the measuring stick for cutting the material. The punch apparatus facilitates the expeditious measurement, marking and cutting of openings for electrical outlet boxes, switch boxes or other utility boxes in sheetrock or other material as well as precise replication of the openings in the sheetrock or other material.

13 Claims, 8 Drawing Sheets

SHEETROCK PUNCH APPARATUS

FIELD OF THE INVENTION

The present invention relates to apparatus for measuring and cutting openings for utility boxes, such as electrical outlet boxes and switch boxes, in sheetrock or other material. More particularly, the present invention relates to a sheetrock punch apparatus which is capable of expeditiously and precisely measuring the locations of electrical outlet boxes or switch boxes in a wall frame and subsequently punching box openings in the sheetrock to expose the electrical outlet boxes or switch boxes.

BACKGROUND OF THE INVENTION

In the construction of interior walls in homes and buildings, a wall frame is constructed which includes a toe plate fastened to the foundation and multiple wall studs extending vertically from the toe plate. Electrical outlet boxes and switch boxes, which contain electrical outlet and switch components, respectively, are attached to the wall studs and other elements of the wall frame and electrically wired into a wiring circuit. A sheetrock panel is then typically nailed to the wall frame, before or after which openings are cut in the sheetrock panel to expose the electrical outlets and switches in the respective electrical outlet boxes and switch boxes.

One of the challenges associated with cutting openings in sheetrock for electrical outlet boxes and switch boxes is that of precisely finding and marking the locations of the boxes with respect to the sheetrock, and cutting the openings in the sheetrock in such a manner that the openings precisely overlie the electrical outlets or switches in the boxes. A common method of cutting the openings in the sheetrock involves the use of a keyhole saw or utility knife for the task. However, this method is time-consuming and is not amenable to precisely replicating the desired openings in the sheetrock.

A number of devices are known in the art for cutting openings in sheetrock for electrical outlet boxes or switch boxes. For example, U.S. Pat. No. 4,730,395 discloses a tool having an interior cutting box and an exterior cutting box with multiple teeth, which face each other for cutting a dry wall panel. A pair of locating nails precisely locates the interior cutting box with respect to an exterior cutting box. A pair of retaining clips is provided on the interior cutting box for retaining the interior cutting box in a receptacle. A center threaded passage extends through the interior cutting box and the exterior cutting box and receives a threaded connecting screw which threads the interior and exterior cutting boxes toward each other as the cutting boxes cut sheetrock located between the boxes. A compression spring pushes the threaded connecting screw to an outward position when not engaged in cutting.

U.S. Pat. No. 4,969,269 discloses a device for punching cutouts through sheets of drywall or similar wall covering sheets that are typically installed on framing members to which utility boxes are mounted. A cutting assembly is removably mounted over the utility or electrical boxes and has substantially the same projected contour of the utility boxes. A puncturing member provided on the cutting assembly is adapted to cut through the drywall. A pulling assembly is adapted to pull the puncturing member and the cutting assembly against the drywall, thereby forming a cutout in the drywall that substantially corresponds to the contour of the utility box.

U.S. Pat. No. 5,797,189 discloses a tool that locates and cuts rectangular junction box holes in dry or similar sheet material. The tool includes templates that define a medial positioning slot and a spaced pair of positioning pins provided on pre-established junction boxes. Surface sheeting material is established over the pre-established junction boxes with the positioning pins projecting through the sheet material to indicate positioning slot location. The tool includes a body articulately carrying two perpendicular pairs of spaced-apart saw blades that are moved reciprocally by spring-biased driving linkage to cut rectilinear holes in the sheet material over the junction boxes.

U.S. Pat. No. 5,946,809 discloses a device for cutting openings having a predetermined shape in a drywall panel. The device includes a housing having a base and an integrally formed sidewall extending outwardly from the periphery of the base. A cavity is defined between the base and the sidewall. A strike plate is slidably mounted in the cavity, and multiple cutting blades are removably secured to the strike plate. When the strike plate is moved from a retracted position to an extended position in the cavity, the cutting blades cut through the drywall panel to form an opening.

U.S. Pat. No. 6,484,408 discloses a hole-cutting device having a spike for driving through a sheet of material. At least one handle is located on the spike at an end, which is opposite to that of the tip of the spike. A first cutting member is located on the spike and substantially adjacent to the handle. A second cutting member is located on the spike and attached to the first cutting member. In use, the handle is operated to move the first cutting member toward the second cutting member and cut a hole in the sheet of material.

U.S. Design Pat. No. 406,537 discloses a drywall-cutting guide, which is used to guide the cutting of openings in drywall.

The conventional devices for cutting box openings in sheetrock or other drywall panels are attended by several disadvantages. For example, the devices are typically complex in structure and operation. Furthermore, the devices cannot be used to both measure and cut the precise locations of box openings in drywall.

Therefore, a sheetrock punch apparatus is needed which is simple in construction and operation; is capable of facilitating the measurement, marking and cutting of utility box openings in sheetrock or other material; expedites the punching of multiple utility box openings in the sheetrock or other material; and can be used to precisely replicate utility box openings in the sheetrock or other material.

SUMMARY OF THE INVENTION

The present invention is generally directed to a sheetrock punch apparatus which is simple in construction and operation and facilitates the expeditious measurement, marking and cutting of openings for electrical outlet boxes, switch boxes or other utility boxes in sheetrock or other material, as well as precise replication of the openings in the sheetrock or other material.

In one aspect of the invention, the sheetrock punch apparatus comprises:
 a base plate;
 a graduated measuring stick provided on the base plate; and
 a punch assembly provided on the measuring stick for location at selected positions on the measuring stick and cutting a utility box opening in sheetrock or other material.

In another aspect of the invention, the measuring stick is pivotally mounted on the base plate.

In still another aspect of the invention, the measuring stick is rigidly mounted on the base plate.

In another aspect of the invention, the punch assembly is slidably mounted to ride along a length of the measuring stick and incorporates means for enabling the punch assembly to be moved to and temporarily maintained at a precise position along the measuring stick.

In another aspect of the invention, the punch assembly includes a blade ring having one or more blades for cutting through the sheetrock or other material to excise an area of the sheetrock to create a precisely located and sized opening.

In yet another aspect of the invention, the punch assembly includes an assembly mount bracket provided on the measuring stick; a front housing portion provided on the assembly mount bracket; and a blade ring interposed between the assembly mount bracket and the front housing portion and having one or more blades which extend through one or more respective blade slots provided in the front housing portion.

In a still further aspect of the invention, the sheetrock punch apparatus is adapted to cut openings for electrical outlet boxes in sheetrock or other material.

In yet another aspect of the invention, the sheetrock punch apparatus is adapted to cut openings for switch boxes in sheetrock or other material.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Shown throughout the Figures, the present invention is generally directed to a sheetrock punch apparatus which is capable of expeditiously and precisely measuring the locations of electrical outlet boxes or switch boxes in a wall frame, and cutting box openings in the sheetrock to expose the electrical outlet boxes or switch boxes. The sheetrock punch apparatus is simple in construction and operation and facilitates the expeditious measurement, marking and cutting of openings for electrical outlet boxes, switch boxes or other utility boxes in sheetrock or other material as well as precise replication of the openings in the sheetrock or other material.

Figure 4:
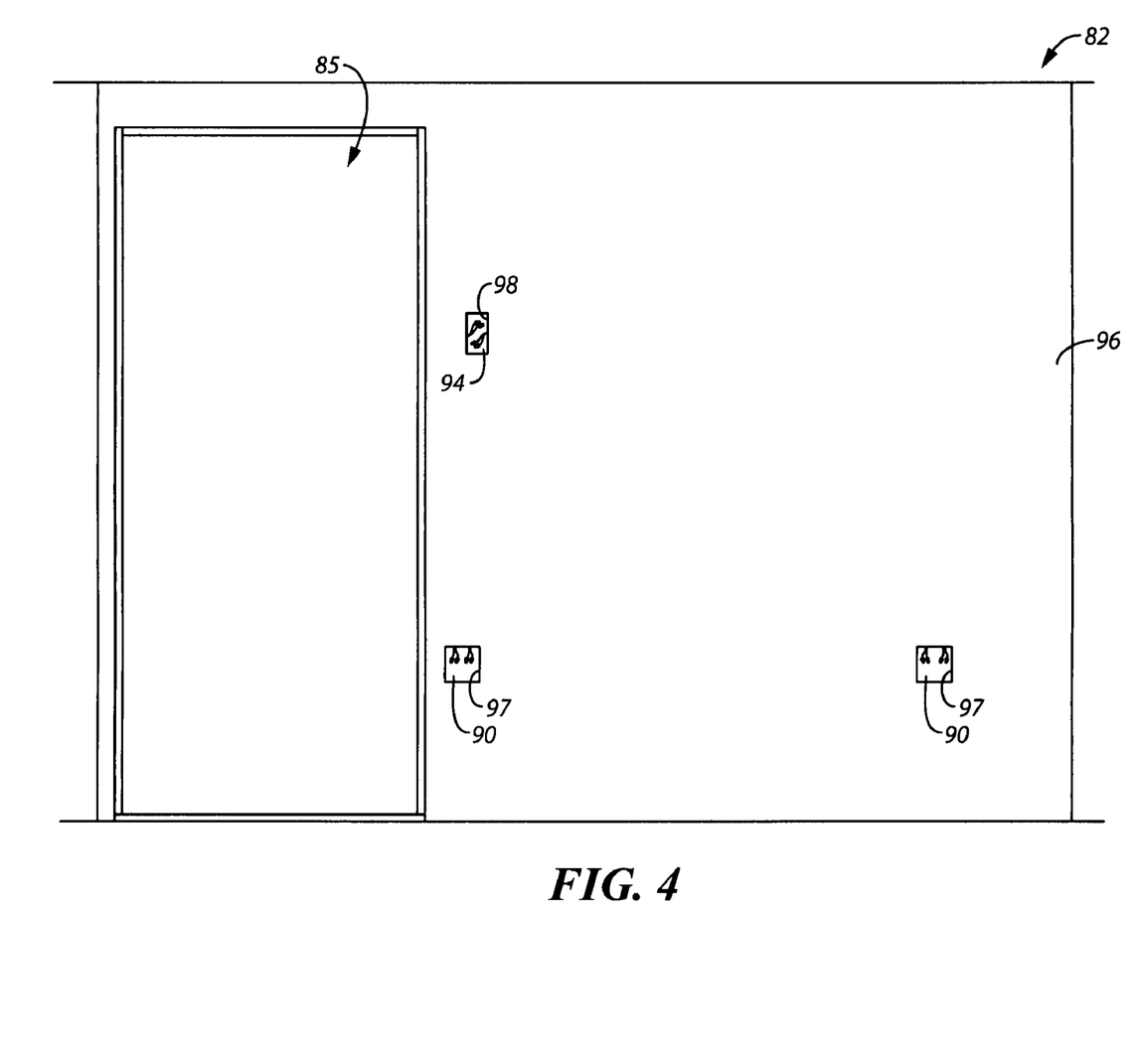
FIG. 4 is a front view of the wall section, after the cutting of box openings in the sheetrock panel using the sheetrock punch apparatus.
Figure 5:
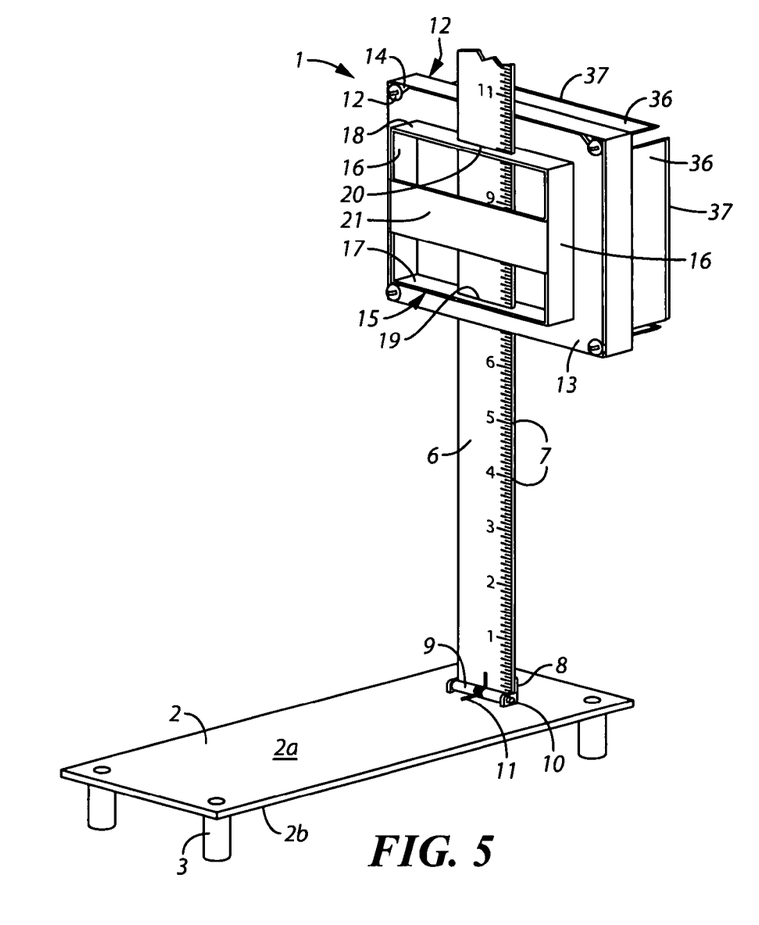
FIG. 5 is a perspective view of an illustrative embodiment of a sheet rock punch apparatus according to the present invention, which apparatus is particularly adapted for the measurement and cutting of electrical box openings in a panel of sheetrock or other material.
Figure 6:
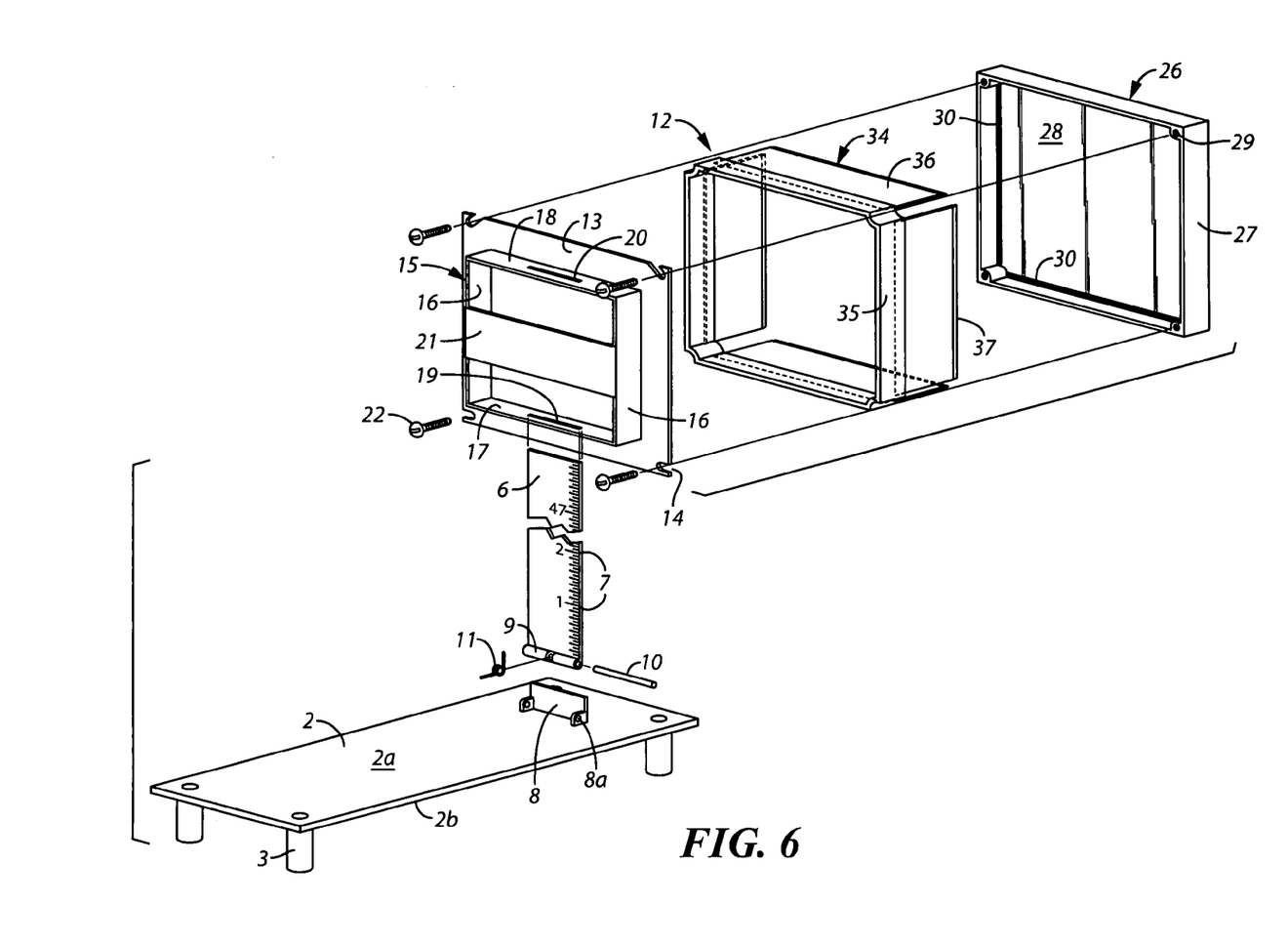
FIG. 6 is an exploded, perspective view of the sheet rock punch apparatus illustrated in FIG. 5.

Referring initially to FIGS. 5 and 6 of the drawings, an illustrative embodiment of the sheetrock punch apparatus, hereinafter apparatus, of the present invention is generally indicated by reference numeral 1. As will be hereinafter described, the sheetrock punch apparatus 1 is suitable for initially measuring the locations of outlet box openings 97 (FIG. 4) which are to be cut in a sheetrock panel 96 and then cutting the outlet box openings 97 in the sheetrock panel 96 in the construction of a wall section 82. The sheetrock punch apparatus 1 includes a base plate 2 having an upper surface 2a and a lower surface 2b and which may have a generally elongated, rectangular configuration. Multiple standoffs 3 are provided on the lower surface 2b of the base plate 2, typically at the respective corners of the base plate 2, for supporting the base plate 2 in a level configuration on a floor (not illustrated) or other supporting surface, in use of the apparatus 1 as will be hereinafter described.

An elongated measuring stick 6, having graduations 7, is provided on the upper surface 2a of the base plate 2 and may be either fixedly or pivotally attached to the base plate 2. The graduations 7 mark various English or Metric units of length measurements on the measuring stick 6, proceeding from the upper surface 2a to the extending or distal end of the measuring stick 6. For example, the graduations 7 may include those of a standard ruler or yardstick having inch markings, quarter-inch markings, eighth-inch markings and sixteenth-inch markings. Additionally or alternatively, the graduations 7 may include centimeter markings, millimeter markings and other length unit markings of the metric system.

Preferably, the measuring stick 6 is pivotally attached to the upper surface 2a of the base plate 2. An example of a hinge arrangement, which is suitable for the purpose, is illustrated in FIG. 6. Accordingly, a hinge bracket 8, typically having a pair of spaced-apart bracket flanges 8a, is provided on the upper surface 2a. A hinge sleeve 9 is provided on the lower end of the measuring stick 6. A hinge pin 10 extends through the hinge sleeve 9 and spans the bracket flanges 8a of the hinge bracket 8. A hinge spring 11 is typically provided on the hinge pin 10 and engages the measuring stick 6 to normally bias the measuring stick 6 in an upwardly-extending configuration in which the measuring stick 6 is generally perpendicular to the upper surface 2a of the base plate 2.

A punch assembly 12 is slidably and adjustably mounted on the measuring stick 6, typically in a manner that will be hereinafter described. As illustrated in FIG. 6, the punch assembly 12 typically includes a back plate 13 which may have a generally rectangular configuration. Screw notches 14 are provided in the edges of the back plate 13, typically adjacent to the respective corners of the back plate 13. An assembly mount bracket 15 is provided on the rear surface of the back plate 13. The assembly mount bracket 15 may include a pair of spaced-apart sidewalls 16 which are spanned by a cross member 21. A bottom wall 17 and a top wall 18 may further span the lower and upper ends, respectively, of the sidewalls 16. A bottom stick slot 19 and a top stick slot 20 are provided in the bottom wall 17 and top wall 18, respectively, in generally vertically aligned relationship with respect to each other. Accordingly, the measuring stick 6 extends through the bottom stick slot 19 and the top stick slot 20 to slidably mount the punch assembly 12 on the measuring stick 6 such that the punch assembly 12 is capable of sliding freely along the entire length of the measuring stick 6. Preferably, a stop mechanism (not illustrated) is provided typically on the assembly mount bracket 15 to engage the measuring stick 6 and maintain the punch assembly 12 at a selected height on the measuring stick 6. The stop mechanism may be any mechanism which is capable of permitting selective sliding of the punch assembly 12 on the measuring stick 6 while enabling selective and reversible locking or stopping of the punch assembly 12 at any desired location on the measuring stick 6. For example, the stop mechanism may include bearings (not illustrated) which are seated in openings (not illustrated) provided in the measuring stick 6 and removably frictionally engage the edges of the measuring stick 6 or grooves (not illustrated) provided in the measuring stick 6. Alternatively, the assembly mount bracket 15 may be fitted with the same type of mechanism that selectively maintains the tape of a tape measure in an extended position from a tape measure housing, for example. Such stop mechanisms are well known to those skilled in the art.

The punch assembly 12 may further include a front housing portion 26, which is attached to the back plate 13. The front housing portion 26 typically includes a generally rectangular front housing frame 27 extending perpendicularly from housing side 28. Multiple screw openings 29 may extend through the front housing frame 27, typically at the respective corners thereof. Accordingly, the front housing portion 26 is attached to the back plate 13 typically by extending screws 22 through the respective screw notches 14 in the back plate 13 and threading the screws 22 into the respective screw openings 29. Multiple blade slots 30, the purpose of which will be hereinafter described, are provided extending through front side 28 of the front housing frame 27.

The punch assembly 12 further includes a blade ring 34, which is interposed between the back plate 13 and the front housing portion 26. The blade ring 34 typically includes a generally rectangular blade ring frame 35. Multiple blades 36, each having a cutting edge 37, extend forwardly from the blade ring frame 35, along the perimeter thereof. Typically, four of the blades 36 extend from the blade ring frame 35 in a generally rectangular configuration. The blade ring frame 35 may be metal or rigid plastic, and the blades 36 may be fixedly or removably mounted in, or attached to, the blade ring frame 35. Alternatively, the blades 36 may be molded into the blade ring frame 35. It will be understood that numerous variations of the blade ring frame 35 are possible and that the blade ring frame 35 may have any composition, shape and design which are consistent with the functional requirements of the sheetrock punch apparatus 1.

The blade ring 34 is mounted in the punch assembly 12 typically by initially inserting the blades 36 through the respective blade slots 30 of the front housing portion 26 until the blade ring frame 35 of the blade ring 34 engages the front housing frame 27 of the front housing portion 26. Next, the screws 22 are extended through the respective screw notches 14 and threaded into the respective screw openings 29 of the front housing frame 27. Preferably, the blade ring 34 is disposable and can be replaced periodically on the punch assembly 12, as deemed necessary.

Although the blade ring 34 of the present invention is illustrated carrying a plurality of individual blades, it will be appreciated by those skilled in the art that a single blade, having a rectangular or any other contiguous configuration, may be provided in lieu of the multiple individual blades. In that case, front housing portion 26 may be eliminated from the assembly and the blade ring frame 35 directly fastened, or otherwise attached, to the back plate 13. For instance, fasteners 22 can be extended into threaded apertures (not shown) provided in the blade ring frame 35.

Figure 7:
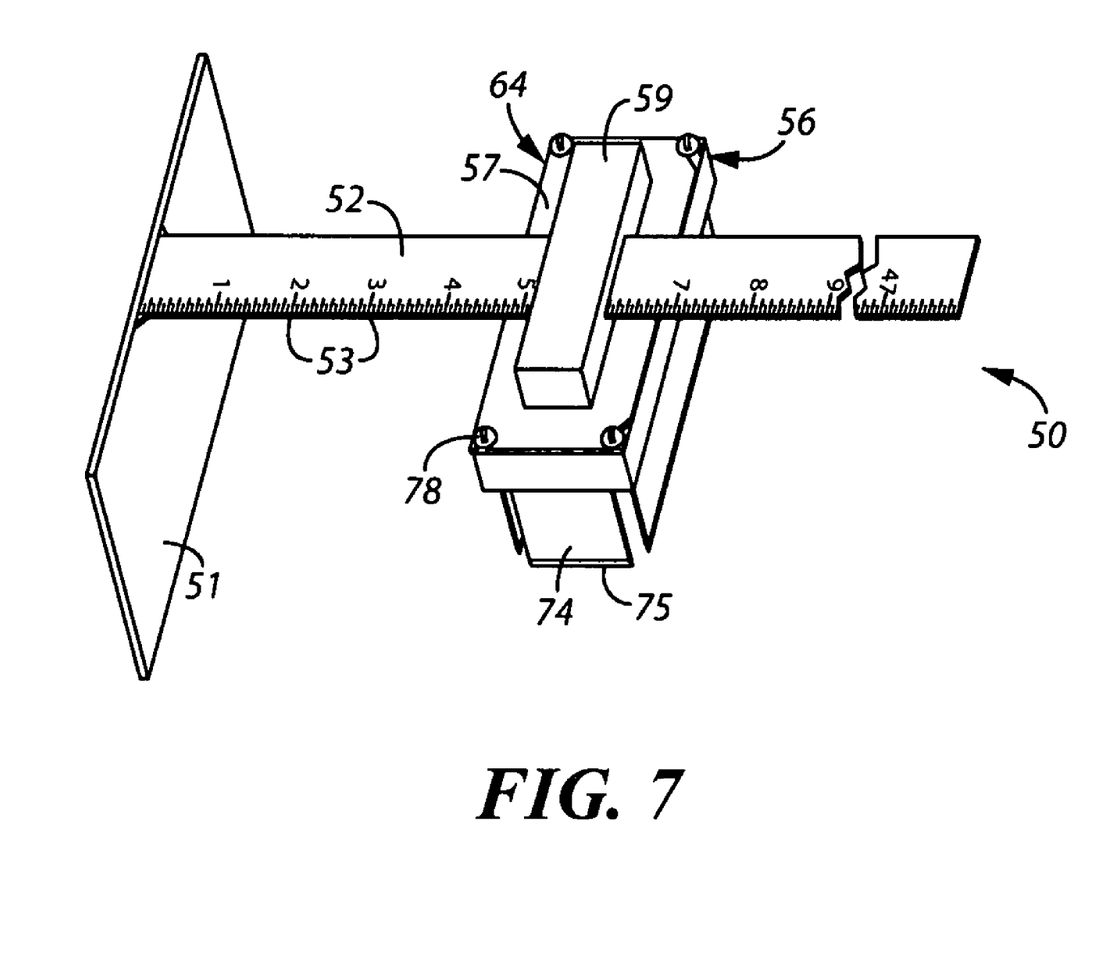
FIG. 7 is a perspective view of an illustrative embodiment of a sheet rock punch apparatus according to the present invention, which apparatus is particularly adapted for the measurement and cutting of switch box openings in a panel of sheetrock or other material.
Figure 8:
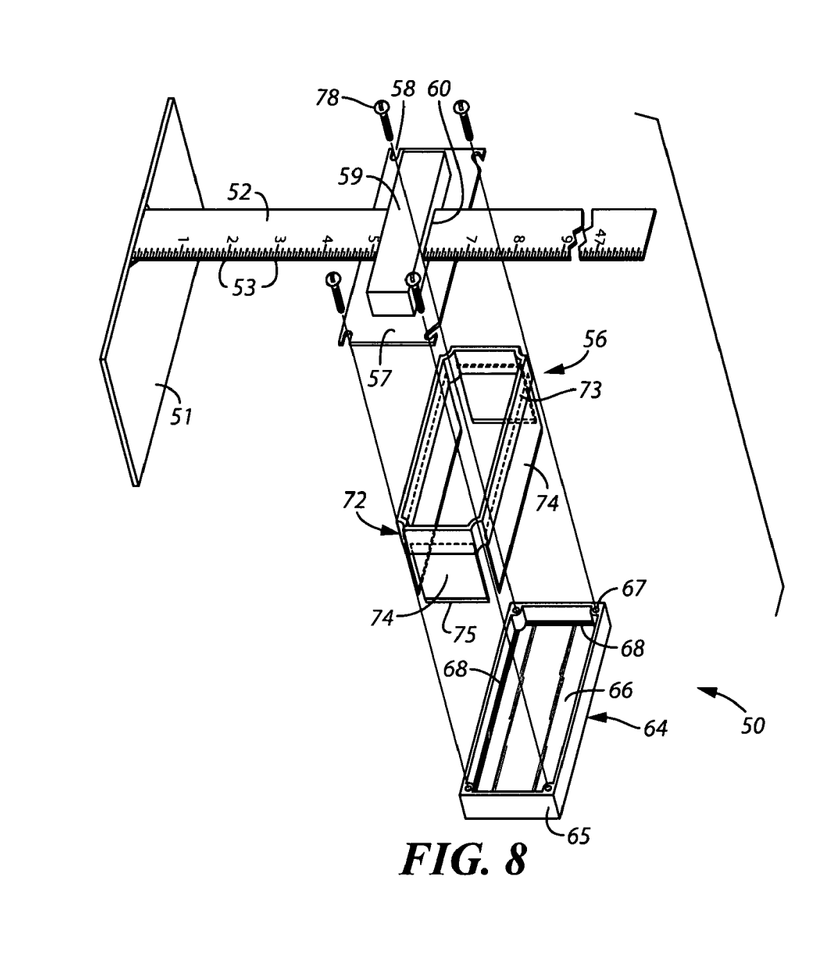
FIG. 8 is an exploded, perspective view of the sheet rock punch apparatus illustrated in FIG. 7.

Referring next to FIGS. 7 and 8 of the drawings, another illustrative embodiment of the sheetrock punch apparatus, hereinafter apparatus, of the present invention is generally indicated by reference numeral 50. As will be hereinafter described, the sheetrock punch apparatus 50 is suitable for initially measuring the locations of switch box openings 98 (FIG. 4) which are to be cut in a sheetrock panel 96 and then cutting the switch box openings 98 in the sheetrock panel 96 in the construction of the wall section 82. The sheetrock punch apparatus 50 includes a base plate 51 which may have a generally elongated, rectangular configuration. The base plate 51 is adapted to rest on the floor (not illustrated) or other supporting surface in use of the apparatus 1 as will be hereinafter described. Alternatively, the base plate 51 may engage structure of a doorframe 86 (FIG. 1), during the measurement, and subsequently excising of, switch box openings 94. An elongated measuring stick 52, having graduations 53, extends upwardly from the base plate 51. Preferably, the angle of the measuring stick 52 with respect to the base plate 51 is rigid. The graduations 53 of the measuring stick 52 may be English units of length measurement, metric units of length measurement or both, as was heretofore described with respect to the apparatus 1 of FIGS. 5 and 6.

A punch assembly 56 is slidably and adjustably mounted on the measuring stick 52, typically in a manner that will be hereinafter described. As illustrated in FIG. 8, the punch assembly 56 typically includes a back plate 57 which may have a generally rectangular configuration and multiple screw notches 58 provided in the edges of the back plate 57. An assembly mount bracket 59 is provided on the rear surface of the back plate 57. A bottom stick slot (not illustrated) and a top stick slot 60 are provided in the assembly mount bracket 59, in generally vertically aligned relationship with respect to each other. Accordingly, the measuring stick 52 extends through the bottom stick slot and the top stick slot 60 to slidably mount the punch assembly 56 on the measuring stick 52 such that the punch assembly 56 is capable of sliding freely along the entire length of the measuring stick 52. Preferably, a stop mechanism (not illustrated) is provided typically on the assembly mount bracket 59 to engage the measuring stick 52 and maintain the punch assembly 56 at a selected height on the measuring stick 52. The stop mechanism may be any mechanism which is capable of permitting selective sliding of the punch assembly 56 on the measuring stick 52 while enabling selective and reversible locking or stopping of the punch assembly 56 at any desired location on the measuring stick 52.

The punch assembly 56 further includes a front housing portion 64 which is attached to the back plate 57 and typically includes a generally rectangular front housing frame 65 which is spanned by a front side 66. Multiple screw openings 67 may extend through the front housing frame 65, typically at the respective corners thereof. Accordingly, the front housing portion 64 is attached to the back plate 57 typically by extending screws 78 through the respective screw notches 58 in the back plate 57 and threading the screws 78 into the respective screw openings 67. Multiple blade slots 68, the purpose of which will be hereinafter described, are provided in front side 66 of the front housing frame 65.

The punch assembly 56 further includes a blade ring 72 that is interposed between the back plate 57 and the front housing portion 64. The blade ring 72 typically includes a generally rectangular blade ring frame 73. Multiple blades 74, each having a cutting edge 75, extend forwardly from the blade ring frame 73, along the perimeter thereof. Typically, four of the blades 74 extend from the blade ring frame 73 in a generally rectangular configuration. It will be understood that numerous variations of the blade ring 72 are possible and that the blade ring may have any composition, shape and design consistent with the functional requirements of the sheetrock punch apparatus 50.

The blade ring 72 is mounted in the punch assembly 56 typically by initially inserting the blades 74 through the respective blade slots 68 of the front housing portion 64 until the blade ring frame 73 of the blade ring 72 engages the front housing frame 65 of the front housing portion 64. Next, the screws 78 are extended through the respective screw notches 58 and threaded into the respective screw openings 67 of the front housing frame 65. Preferably, the blade ring 72 is disposable and can be replaced periodically on the punch assembly 56, as deemed necessary.

As previously noted hereinabove with respect to the punch assembly apparatus shown in FIGS. 5-6, although blade ring 72 is illustrated carrying a plurality of individual blades, it will be appreciated by those skilled in the art that a single blade, having a rectangular or any other contiguous configuration, may be provided in lieu of the multiple individual blades. In that case, front housing portion 64 may be eliminated from the assembly and the blade ring frame 73 directly fastened, or otherwise attached, to the back plate 57. For instance, fasteners 78 can be extended into threaded apertures (not shown) provided in the blade ring frame 73.

Figure 1:
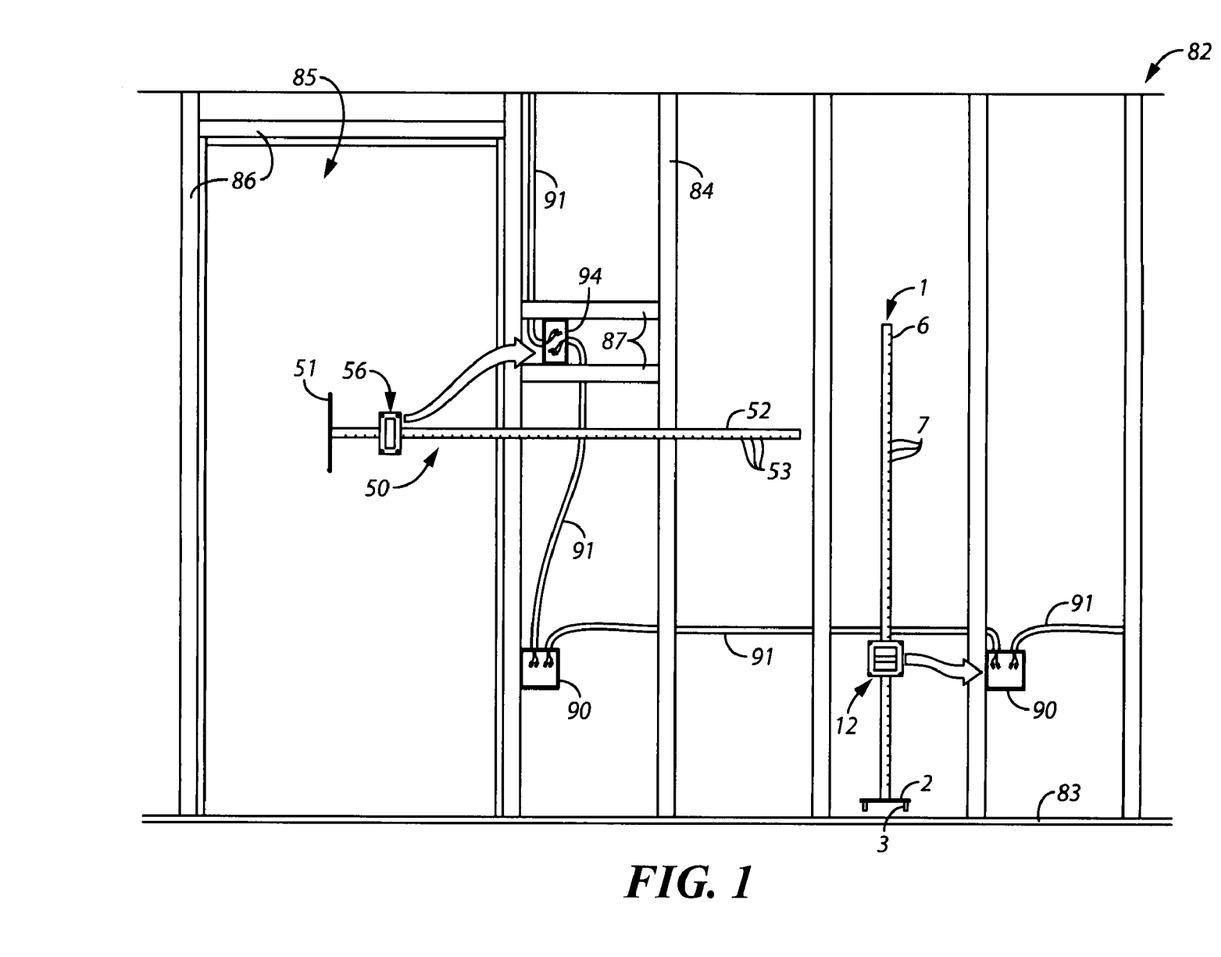
FIG. 1 is a front view of a wall section in the process of construction and having a pair of electrical outlet boxes and a switch box, preparatory to measurement of the locations of an electrical outlet box and the switch box, respectively, in typical application of the sheetrock punch apparatus according to the present invention.
Figure 2:
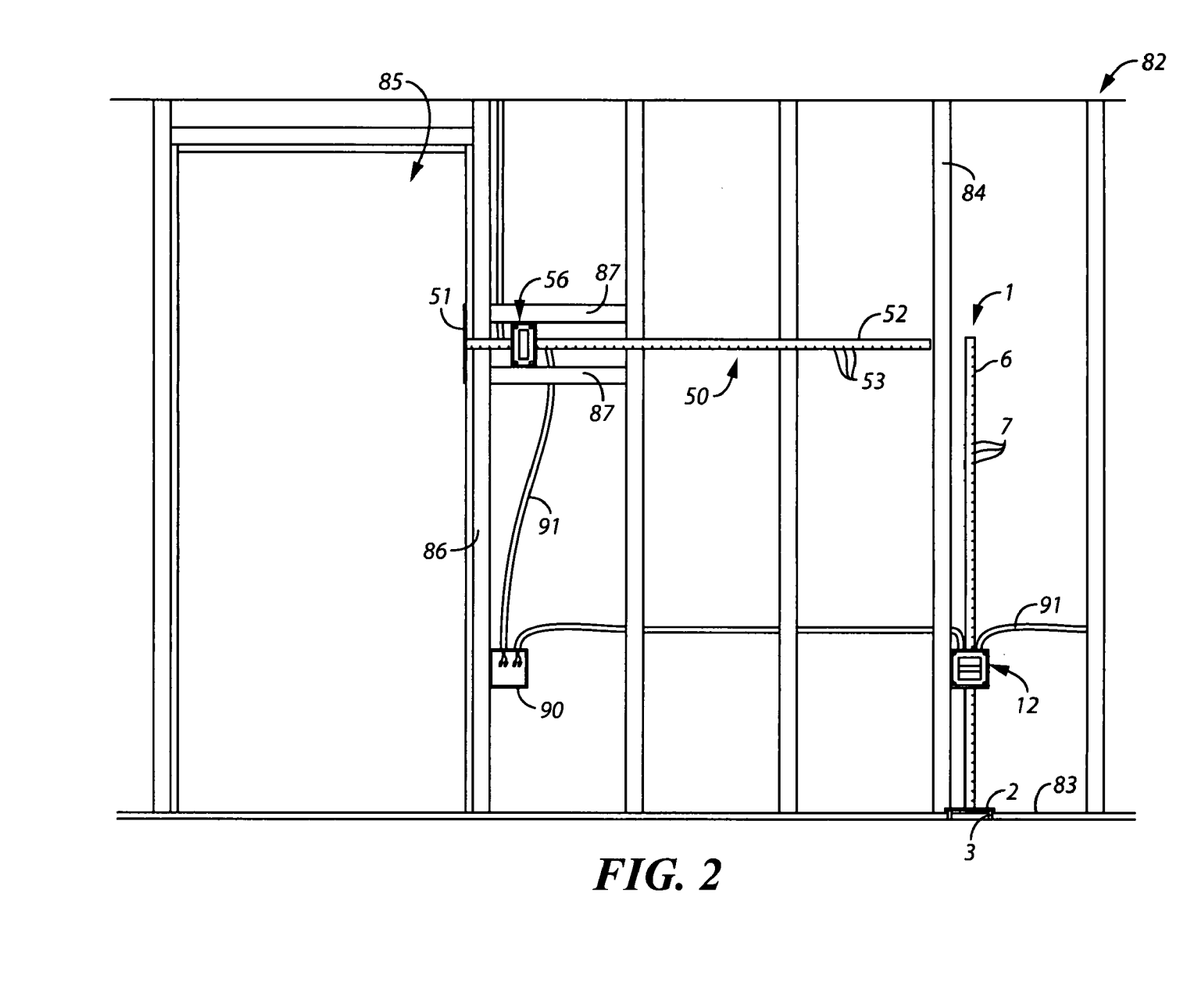
FIG. 2 is a front view of the wall section, more particularly illustrating measurement of the locations of the electrical outlet boxes and the switch box in typical application of the sheetrock punch apparatus according to the present invention.

Referring next to FIGS. 1-4 of the drawings, in typical use of the invention, the apparatus 1 is used to measure, mark and cut outlet box openings 97 (FIG. 4) in a sheet rock panel 96 during construction of a wall section 82, whereas the apparatus 50 is used to measure, mark and cut switch box openings 98 in the sheet rock panel 96. As illustrated in FIGS. 1 and 2, the wall section 82 typically includes a toe plate 83 that is typically bolted to a foundation (not illustrated). Multiple wall studs 84 are attached to and extend vertically from the toe plate 83. The wall section 82 may further include a doorway 85 that is framed by a doorframe 86. One or multiple, horizontal braces 87 may extend between adjacent wall studs 84. Multiple electrical outlet boxes 90, each of which contains one or multiple electrical sockets (not illustrated), are attached to wall studs 84 in the wall section 82. Similarly, one or multiple light switch boxes 94, each of which contains an electrical switch (not illustrated), are attached to the wall studs 84 or to one or more of the braces 87. Electrical wiring 91 connects the electrical outlet boxes 90 and the light switch boxes 94 to an electrical circuit.

As illustrated in FIG. 1, prior to attachment of the sheet rock panel 96 (FIG. 3) to the toe plate 83 and wall studs 84, the horizontal and vertical locations of each electrical outlet box 90 and each light switch box 94 in the wall section 82 are first individually measured. For each electrical outlet box 90, this is typically accomplished using the apparatus 1. Accordingly, the standoffs 3 of the base plate 2 of the apparatus 1 are initially placed on the foundation (not illustrated) adjacent to the wall section 82, with the base plate 2 positioned such that the measuring stick 6 is aligned with the centerline of the electrical outlet box 90. The standoffs 3 prevent unevenness in the base plate 2 due to the presence of debris and particles on the foundation. The punch assembly 12 is then slid vertically on the measuring stick 6 of the apparatus 1 until the height of the punch assembly 12 precisely corresponds to the height of each electrical outlet box 90 in the wall section 82, as illustrated in FIG. 2. In this position, the positions of the blades 36 on the blade ring 34 correspond to the area that lies just inside the perimeter of the electrical outlet box 90. The height of the punch assembly 12 on the measuring stick 6 is recorded by, for example, noting which of the graduations 7 on the measuring stick 6 corresponds to the height of the punch assembly 12 and writing the indicated height on the foundation on which the base plate 2 rests, using chalk, for example. The location of the edge of the base plate 2 is also marked on the foundation to record the horizontal location of the electrical outlet box 90 along the wall section 82.

Horizontal and vertical positioning of each light switch box 94 may be accomplished using the apparatus 50. The vertical position of each switch box 94 may be determined and recorded using the apparatus 50, in a manner that is similar to that heretofore described with respect to vertical measurement of the electrical outlet boxes 90. The horizontal position of each light switch box 94 along the wall section 82 may be determined by placing the upper surface of the base plate 51 of the apparatus 50 against the inner facing of the door frame 86, as illustrated in FIG. 2, and sliding the punch assembly 56 along the measuring stick 52 until the punch assembly 56 is precisely aligned with the light switch box 94. The horizontal position of the punch assembly 56 with respect to the graduations 53 on the measuring stick 52 is noted and recorded.

Figure 3:
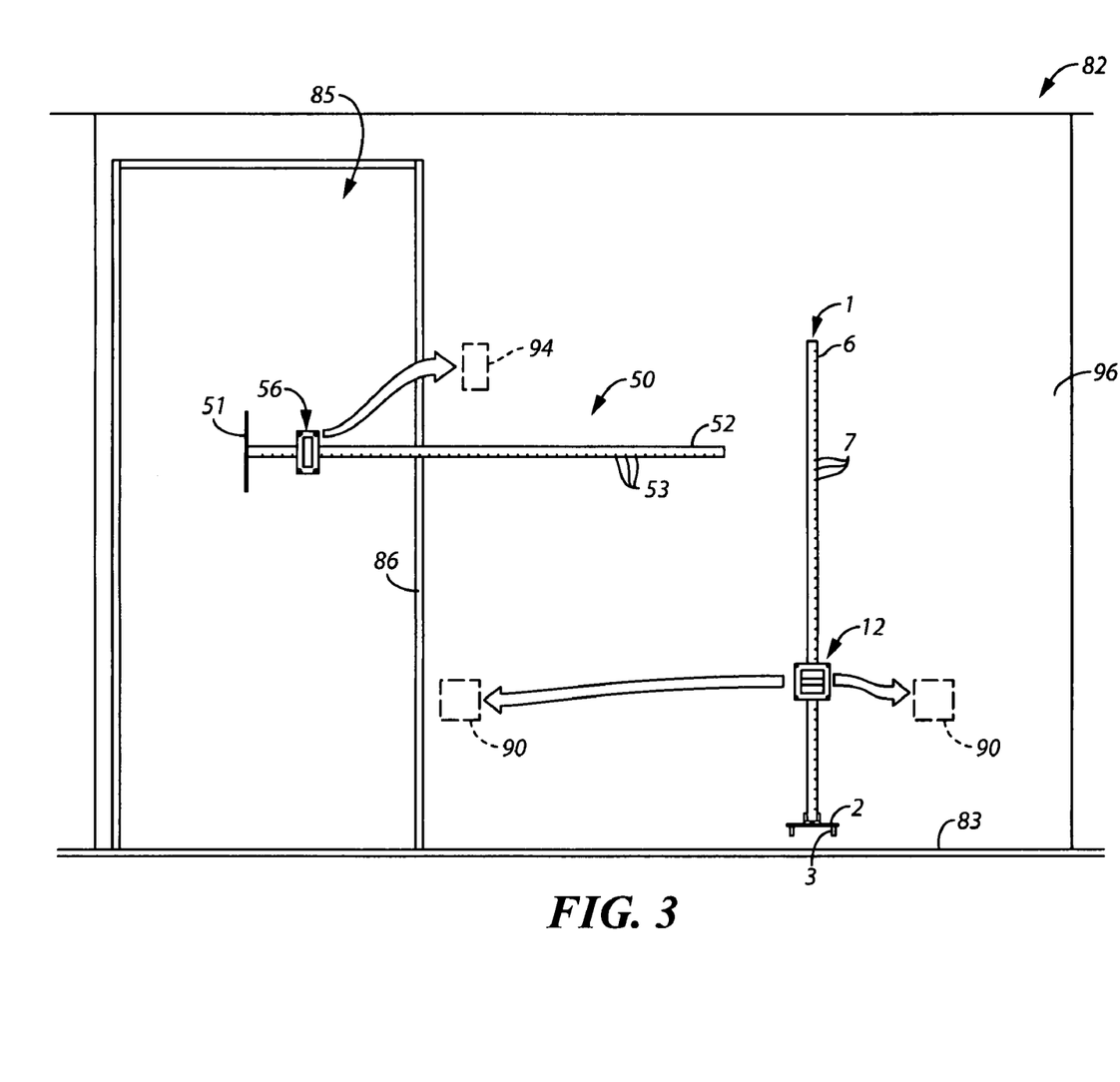
FIG. 3 is a front view of the wall section, with a sheetrock panel attached to the wall section over the electrical outlet boxes and the switch box, preparatory to the cutting of box openings in the sheetrock panel corresponding to the locations of the electrical outlet boxes and switch box in typical application of the sheetrock punch apparatus according to the present invention.

As illustrated in FIG. 3, after the sheetrock 96 is hanged typically by nailing the sheetrock 96 on the wall section 82, the apparatus 1 is repositioned on the foundation and the punch assembly 12 repositioned on the measuring stick 6 such that the position of the blades 36 of the punch assembly 12 again corresponds to the pre-marked positions of each of the electrical outlet boxes 90. The blades 36 of the punch assembly 12 are then driven through the sheetrock 96 typically by manually pushing, or by striking a hammer (not illustrated), mallet (not illustrated) or the like, against the cross member 21 (FIG. 6) of the assembly mount bracket 15, thereby excising that portion of the sheetrock 96 which is inside the perimeter of the blades 36, and therefore, inside the perimeter of the outlet box 90. This forms an outlet box opening 97, as illustrated in FIG. 4, through which the electrical sockets (not illustrated) in each electrical outlet box 90 are exposed. Each light switch box 94 is similarly exposed by repositioning the apparatus 50 with respect to the pre-marked positions of each switch box 94 and driving the blades 74 of the punch assembly 56 through the sheetrock 96, thereby excising that portion of the sheetrock 96 which is inside the perimeter of the blades 74, and thus, inside the perimeter of the switch box 94. This forms a switch box opening 98, as illustrated in FIG. 4, through which the switch (not illustrated) in each switch box 94 is exposed.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A punch apparatus for cutting an opening in a sheet of material, comprising:
   a base plate;
   a measuring stick having a longitudinal axis, wherein said measuring stick is carried by said base plate;
   a punch assembly having an assembly mount bracket adjustably carried by said measuring stick, a back plate carried by said assembly mount bracket, a front housing portion carried by said back plate and a blade ring having first and second pairs of blades interposed between said back plate and said front housing portion for cutting the material; and wherein said first pair of blades is oriented wherein a transverse axis of each blade of said first pair of blades substantially intersects said longitudinal axis of said measuring stick and said second pair of blades is disposed on respective sides of said measuring stick.

2. The punch apparatus of claim 1 further comprising a plurality of standoffs carried by said base plate for supporting said base plate on a surface.

3. The punch apparatus of claim 1 further comprising a hinge bracket carried by said base plate and wherein said measuring stick is pivotally carried by said hinge bracket.

4. The punch apparatus of claim 3 further comprising a bias mechanism engaging said hinge bracket and said measuring stick for biasing said measuring stick in an extended, functional position with respect to said base plate.

5. The punch apparatus of claim 4 wherein said bias mechanism comprises a spring.

6. The punch apparatus of claim 1 further comprising a pair of stick slots provided in said assembly mount bracket and slidably receiving said measuring stick.

7. The punch apparatus of claim 1 wherein said front housing portion comprises a generally rectangular front housing frame.

8. The punch apparatus of claim 7 further comprising a plurality of blade slots provided in said front housing frame of said front housing portion and wherein said first and second pairs of blades extends through said plurality of blade slots, respectively.

9. A punch apparatus for cutting an opening in a sheet of material, comprising:
   a base plate;
   a measuring stick carried by said base plate;
   a punch assembly having at least one blade adjustably carried by said measuring stick for cutting the material;
   wherein said punch assembly comprises an assembly mount bracket adjustably engaging said measuring stick and a blade ring carried by said assembly mount bracket, and wherein said at least one blade is carried by said blade ring;
   a front housing portion carried by said assembly mount bracket; and
   at least one blade slot provided in said front housing portion and wherein said at least one blade extends through said at least one respective blade slot.

10. A punch apparatus for cutting an opening in a sheet of material, comprising:
    a base plate;
    a measuring stick carried by said base plate;
    a punch assembly having an assembly mount bracket adjustably carried by said measuring stick, a back plate carried by said assembly mount bracket, a front housing portion carried by said back plate and a blade ring having at least one blade interposed between said back plate and said front housing portion for cutting the material;
    wherein said front housing portion comprises a generally rectangular front housing frame; and
    at least one blade slot provided in said front housing frame of said front housing portion and wherein said at least one blade extends through said at least one blade slot.

11. A punch apparatus for cutting an opening in a sheet of material, comprising:
    a base plate;
    a measuring stick having a longitudinal axis, wherein said measuring stick is carried by said base plate;
    a punch assembly having a plurality of blades adjustably carried by said measuring stick for cutting the material;
    wherein said punch assembly comprises an assembly mount bracket adjustably engaging said measuring stick and a blade ring carried by said assembly mount bracket, and wherein said plurality of blades is carried by said blade ring; and
    wherein at least one of said plurality of blades is oriented wherein a transverse axis of said blade substantially intersects said longitudinal axis of said measuring stick.

12. The punch apparatus of claim 11 further comprising a front housing portion carried by said assembly mount bracket.

13. The punch apparatus of claim 12 further comprising a plurality of blade slots provided in said front housing portion and wherein said plurality of blades extends through plurality of respective blade slots.

* * * * *